June 30, 1936.　　　I. H. STRIDER　　　2,045,881

GLASS BANDING MACHINE

Filed May 15, 1934　　　2 Sheets-Sheet 1

Inventor

Isaac H. Strider

By

Attorneys

June 30, 1936.  I. H. STRIDER  2,045,881

GLASS BANDING MACHINE

Filed May 15, 1934  2 Sheets-Sheet 2

Inventor
Isaac H. Strider

Attorneys

Patented June 30, 1936

2,045,881

UNITED STATES PATENT OFFICE 2,045,881

GLASS BANDING MACHINE

Isaac H. Strider, Wheeling, W. Va., assignor to Hazel-Atlas Glass Co., Wheeling, W. Va., a corporation of West Virginia Application May 15, 1934, Serial No. 725,807

12 Claims. (Cl. 91—12)

The invention relates particularly to a machine for applying bands of paint to various ceramic articles, such as, tumblers and the like; and is an improvement upon a banding machine disclosed in an application of Schwab and Wheeler, Ser. No. 691,838, filed October 2, 1933.

One of the objects of the invention is to provide improved means for carrying the paint applying rollers, by which the position of the rollers can be quickly and easily adjusted for articles of different sizes or for articles of different shape, and which will permit the rollers to give if there are irregularities in the article being decorated.

Another object of the invention is to provide means for automatically throwing the rollers into and out of contact with the articles to be decorated.

A further object of the invention is to provide means for varying the duration of time the paint rollers are in contact with the article.

Another object of the invention is to provide means by which the speed of rotation of the article may be regulated.

Still another object of the invention is to provide means by which the paint rollers are moved gradually into and out of contact with the articles to be decorated.

A further object of the invention is to provide means for varying the speed of the machine, i. e., the number of operations per minute.

Numerous other objects and advantages of the invention will be apparent to those skilled in the art from the following detailed description, when taken in connection with the accompanying drawings; in which,—

Figure 1:
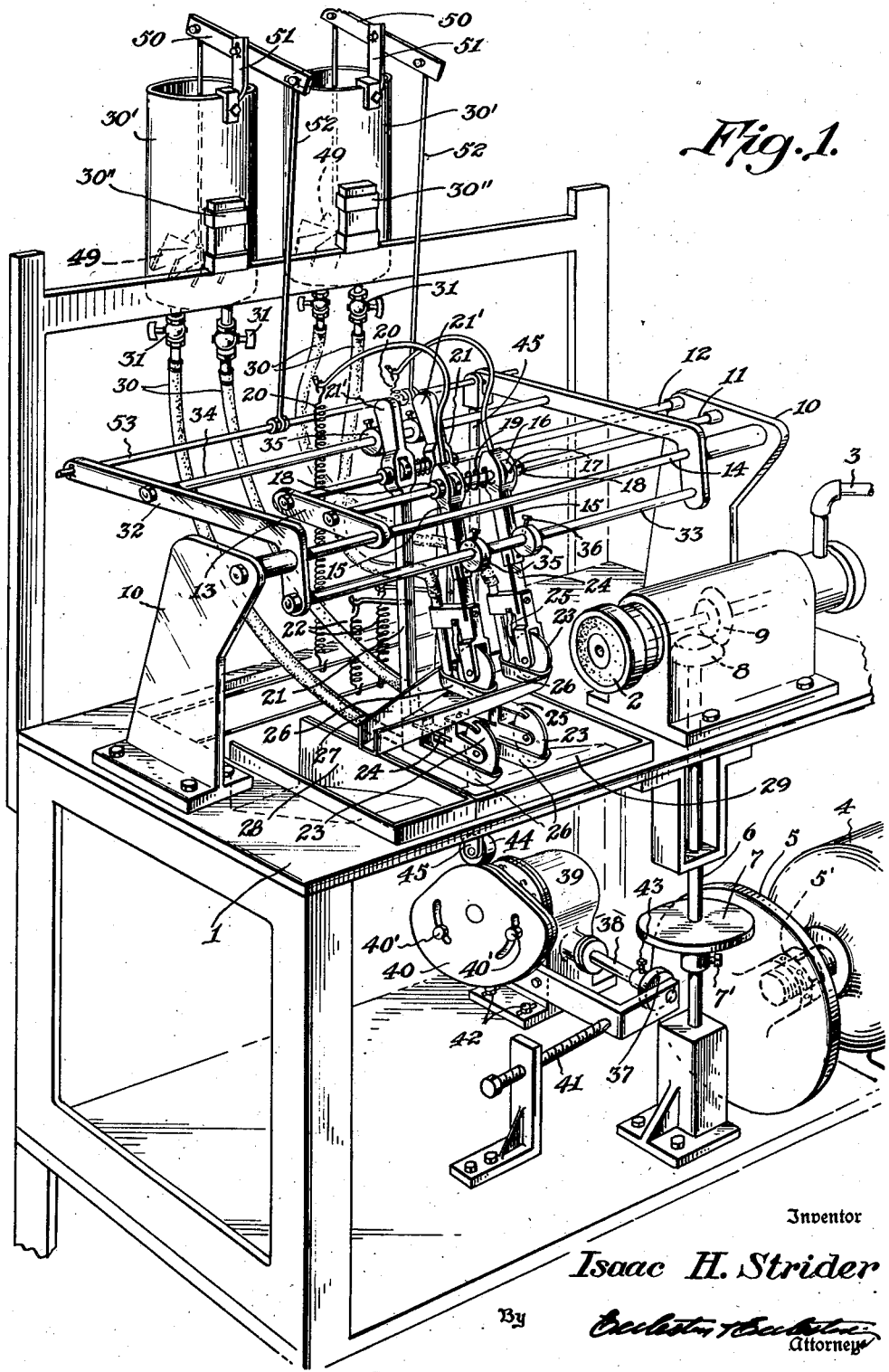
Figure 1 is a perspective view of the apparatus.
Figure 2:
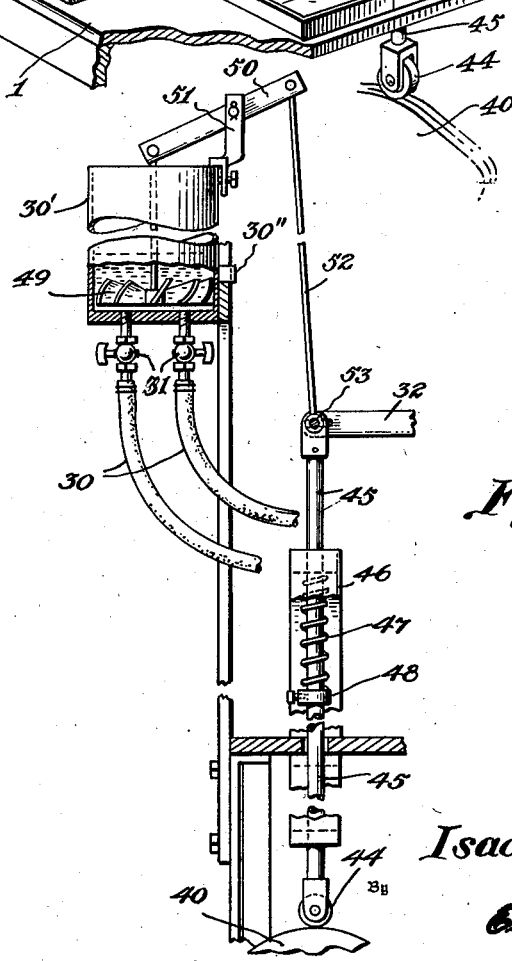
Figure 2 is a detail view of one form of apparatus for operating the stirrer; and—

Referring to the drawings in more detail and particularly to Figures 1 and 2, numeral 1 refers to a table or other suitable support for the apparatus. Numeral 2 indicates a cup or chuck to receive the tumbler or other article to be decorated. The chuck is in communication with any desired source of vacuum (not shown) by a pipe 3. The article to be decorated is placed in the chuck by hand and is maintained there by the vacuum during the decorating operation.

Numeral 4 refers to a motor which drives a friction disc 5. A vertical shaft 6 carries a friction disc 7 which is in engagement with the friction disc 5, whereby the shaft is continuously rotated. This shaft carries at its upper end a gear 8 which meshes with a gear 9 to continuously rotate the cup or chuck 2. In applying bands of paint to articles the speed of rotation of the article is important, and different speeds are desirable for articles of different sizes and for different conditions of the paint. In order to obtain the most desirable speed in any particular operation, the friction disc 7 is adjustably mounted on the shaft 6 by any desired means, as by set screw 7'. To take care of wear between the friction discs, the disc 5 is adjustably mounted on the motor shaft and may be adjusted toward the disc 7 by lock nuts 5'.

Numeral 10 refers to the frame plates of the machine which carry the mechanism for applying the paint. Rods 11 and 12 have one end mounted in one of the frame plates, and the opposite end mounted in a bar 13 which is supported by a rod or shaft 14 carried by the frame plates.

Pivotally mounted on the rod 11 are a number of arms 15. Two of these arms are shown in the drawings, but obviously the number may be greater or less depending upon the number of bands to be applied to the article. The arms are, of course, swung toward and from the article to be decorated, and it is desirable to adjust them laterally to properly position the bands on the article. Any desired means may be employed to effect the adjustment, but in the specific form illustrated the arms are forked where they are mounted on the rod and between the prongs of each fork is a lug 16 which is adjustable along the rod by means of a set screw 17. And preferably a collar 18 is set-screwed on the rod on the outside of each arm. It is also desirable to prevent any wabbling movement of the arms, if there should be too much looseness between the parts, and this is accomplished by inserting a coil spring 19 between the arms, which holds the prongs of the arms against the lug 16 and the collar 18. The lower ends of the arms 15 are normally urged toward the article to be decorated, by any desired means, as by coil springs 20.

Mounted on rod 12 are arms 21, similar to the arms 15, but arranged in staggered relation with respect thereto. These arms are also preferably adjustable along the rod 12 by the means described in connection with arms 15 or by other suitable means; and the lower ends of these arms 21 are normally urged toward the article to be decorated, by means of springs 22. The number of arms 21 employed varies with the number of bands to be applied to the article; two of the arms being shown in the drawings. These two arms 21, together with the two arms 15, provide for the simultaneous application of four bands to the article.

The lower end of each of the arms 15 and 21 is provided with a paint applying roller 23, which roller revolves freely when in contact with the article being decorated. In order to take care of irregularities in the article being decorated, the rollers are preferably, though not necessarily, connected with the arms by some resilient means, as by leaf springs 24. Also, a wiper 25 is preferably associated with each roller.

Associated with each roller is an individual paint reservoir 26; the reservoirs, of course, being movable with the rollers and arms. To take care of paint overflow and drippings a trough 27 is carried by the individual reservoirs of the arms 15; and this trough empties into a drain 28 leading to a collecting receptacle (not shown). The overflow and drippings from the reservoirs carried by the arms 21 are received by a drain 29 which leads to another collecting receptacle (not shown). Paint of the desired color is supplied to the several individual reservoirs by means of hose 30 leading from paint drums 30'; the number of drums depending upon the number of different colors to be applied to the article, there being two such drums in the specific embodiment illustrated. The volume of paint flowing from the drums to each individual reservoir, is regulated by valves 31.

The rollers are periodically moved toward and from the article to be decorated, by means of an oscillatable frame 32, which will now be described. In the specific embodiment illustrated two sets of arms and rollers are shown, and they may be termed the upper set and lower set; and the units of the two sets being arranged in staggered relation. And in this specific embodiment means is shown for simultaneously moving the units of both sets toward and from the article; but it will be understood, of course, that either the upper or lower set may be omitted, as is frequently the case when only a very small number of bands are to be applied to the article.

The oscillatable frame 32, which is pivotally mounted on the shaft 14, carries a rod 33 at its forward end, in cooperative relation with the arms 15; and rearwardly of its pivot the oscillatable frame carries a rod 34, in cooperative relation with upwardly extending projections 21' on the arms 21. Thus when the rear end of the frame is rocked downwardly the rods 33 and 34 are moved away from the arms 15 and 21, thereby permitting the springs 20 and 22 to move the rollers 23 of both sets of arms into engagement with the article to be decorated. For the purpose of individually adjusting the extent of forward movement of each paint roller, there is preferably provided a lug or cam 35 eccentrically mounted on the rod 33 in cooperative relation with each arm 15; and similar lugs or cams being eccentrically mounted on the rod 34 in cooperative relation with the extensions 21' of arms 21. To adjust the forward limit of movement of any particular paint roller it is only necessary to turn the cam sufficiently to properly position the roller, and then secure the cam in its adjusted position by set-screw 36.

The preferred means for oscillating the frame 32 will now be described. Numeral 37 refers to a friction disc which is in engagement with the previously described friction disc 5. The disc 37 drives a shaft 38, which through a gear box 39 causes the continuous rotation of a split cam 40. To take care of wear between the friction discs 37 and 5, the shaft 38 and its disc 37 may be adjusted toward the disc 5 by means of an adjusting screw 41; it being necessary to first loosen screws 42 arranged in appropriate slots in the base of the gear box 39. To vary the speed of rotation of the split cam 40, and thus vary the number of times per minute the rollers are moved into operative position, it is only necessary to adjust the disc 37 in or out, by means of set screw 43.

Riding upon the cam 40 is a roller 44 carried by the lower end of a connecting rod 45; the upper end of the rod being connected with the oscillatable frame 32. By reference to Fig. 2 it will be seen that in the specific embodiment illustrated, the connecting rod 45 is guided in a frame 46; and the roller 44 urged into contact with the cam 40 by means of a coil spring 47 arranged on the connecting rod between an end of the frame and a collar 48 adjustably mounted on the connecting rod.

The continuously revolving cam 40 causes the connecting rod 45 to be raised and lowered, thereby rocking the frame 32, and moving the paint rollers 23 into and out of contact with the article to be decorated. In Figure 1 the roller 44 is shown at the top of the cam, in which position the paint rollers 23 are in contact with the article. As the cam continues its rotation the roller 44 rides up the gradually inclined surface of the cam, whereby the paint rollers are gradually removed from the article. The paint rollers remain out of contact with the article until upon continued rotation of the cam the roller 44 rides down a gradually inclined surface thereby permitting the springs to move the arms forward to bring the paint rollers into contact with the article. The time the paint rollers are in contact with the article can be varied by the adjustment of the split cam, as by means of bolts 40'.

For the purpose of stirring the paint in the drums 30', which are removably mounted on the frame by means of straps 30'', there is preferably provided in each drum an agitator 49, which is suspended from an arm 50 pivotally mounted upon a bracket 51, removably attached to the drum. The opposite end of the arm has attached to it one end of a connecting rod 52; the other end of the connecting rod being connected with a transverse rod 53 carried by the oscillatable frame 32. Thus as the frame is rocked in the manner hereinbefore described, the agitators 49 are raised and lowered through the paint in the drums, thereby maintaining the paint in proper condition.

Figure 3:
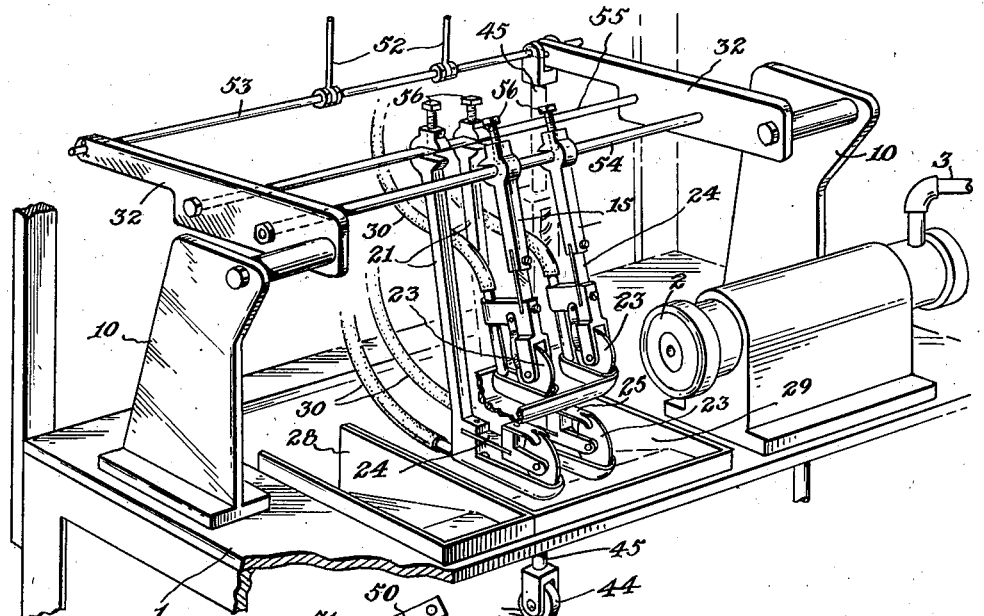
Figure 3 is a similar view of a modified form of the invention, but omitting various parts.

Reference is now to be had to Figure 3, which shows a modified form of the invention. This figure is only fragmentary, and it will be understood that the omitted parts are similar to the parts shown in Figure 1; and, in fact, the parts shown in Figure 3 are similar to the parts shown in Figure 1 except as to the mounting of the arms 15 and 21. In accordance with Figure 1 the arms are pivotally mounted on rods fixed in the frame of the machine, and the arms are moved back and forth by an oscillatable frame. But in the modified form the arms are fixed on rods carried by the oscillatable frame. Of course either one or two sets of arms may be employed, and the number of arms in either set may vary; but in the form illustrated two sets are employed and there are two arms in each set. Mounted against rotation in the oscillatable frame 32 are two rods 54 and 55; the rod 54 carrying the arms 15 and the rod 55 carrying the arms 21. The arms are adjustable along and about the rods by means of set screws 56. In this construction the rocking of the frame moves the arms and the rollers carried thereby toward the article to be decorated, and any wabbling of the arms is prevented. To adapt the device to articles of different sizes or of irregular contour, it is only necessary to loosen the set screws 56 and turn the arms about the rod to the desired extent; and obviously the arms can also be adjusted laterally to any desired position.

Both forms of apparatus have been described in detail, and further description of the operation is unnecessary as the mode of operation has been described in conjunction with the description of the apparatus. In accordance with the invention herein disclosed the entire operation of painting a number of bands of the same or different colors on ceramic articles such as tumblers, bottles and the like, is entirely automatic except for the insertion and removal of the articles. Not only is the painting operation entirely automatic, but also there are numerous features which insure efficient operation at all times. For example, if the article being decorated is rotated too fast there is a tendency to throw the paint toward the center of the band, making the distribution of the paint unequal. To provide the most desirable speed of rotation it is only necessary to adjust the friction disc 7. It is also important that the rollers remain in contact with the article for the proper time, and this time varies with the consistency of the particular paint being used. The time the rollers are in contact with the article can be easily and accurately varied by the adjustment of the split cam 40. Also, it is desirable that the rollers be removed slowly from the article. If the rollers are removed too suddenly from the article they leave a dab or fan-shaped portion, or otherwise deform the band. As previously mentioned, the cam is designed to remove the rollers from the article at the proper speed. Further, the rollers can be quickly adjusted to articles of different sizes or to articles of an irregular contour. In the form shown in Figure 1 this is accomplished by adjusting the eccentrics 35; and in the form shown in Figure 2 it is accomplished by the set screws 56. And in both forms any irregularities in the formation of the article are taken care of by the leaf springs 24. Also in both forms, wabbling of the arms carrying the paint rollers is prevented. It is possible to decorate some articles more quickly than others, and to vary the number of cycles of operation per minute it is only necessary to adjust the friction disc 43. The invention also includes means for taking care of the wear of the friction discs, collecting the paint overflow and drippings, continuously stirring the paint, etc. And while the particular apparatus illustrated has been described in considerable detail, it will be understood that many changes and modifications can be made without departing from the spirit of the invention, and all such changes and modifications are intended to be included within the scope of the appended claims.

What I claim is:

1. An apparatus for painting bands on ceramic articles, including an oscillatable arm, a paint applying roller carried by the arm, a paint reservoir associated with and movable with said roller, a rod in operative relation with the arm, means for moving the rod to control the movement of the arm toward an article to be decorated, and adjustable means mounted on said rod for regulating the limit of movement of said arm toward the article.

2. An apparatus for painting bands on ceramic articles, including two sets of arms, paint applying rollers carried by the arms of both sets, a paint reservoir associated with and movable with each roller, the rollers having their lower portions in the reservoirs and their upper portions projecting above the reservoirs, an oscillatable frame, rods carried by said frame in operative relation with the sets of arms and controlling the movements of the arms, and mechanically operated means for periodically rocking said frame.

3. An apparatus for painting bands on ceramic articles, including an oscillatable arm, a paint applying roller carried by the arm, a paint reservoir associated with and movable with said roller, the roller having its lower portion in the reservoir and its upper portion projecting above the reservoir, and a continuously revolving cam causing periodic movement of said roller and reservoir toward and from an article to be decorated.

4. An apparatus for painting bands on ceramic articles, including an oscillatable arm, a paint applying roller carried by the arm, a paint reservoir associated with and movable with said roller, and a continuously revolving cam causing periodic movement of said roller toward and from an article to be decorated, said cam being adjustable to vary the duration of time the roller is in contact with the article.

5. An apparatus for painting bands on ceramic articles, including an oscillatable arm, a paint applying roller carried by the arm, a paint reservoir associated with and movable with said roller, the roller having its lower portion in the reservoir and its upper portion projecting above the reservoir, a continuously revolving cam causing periodic movement of said roller and reservoir toward and from an article to be decorated, and means for varying the speed of rotation of said cam to vary the number of decorating operations per minute.

6. An apparatus for painting bands on ceramic articles, including an oscillatable arm, a paint applying roller carried by the arm, a paint reservoir associated with and movable with said roller, the roller having its lower portion in the reservoir and its upper portion projecting above the reservoir, a continuously revolving chuck to receive an article to be decorated, a continuously revolving cam causing periodic movement of said roller and reservoir toward and from the article, means for varying the speed of rotation of said cam to vary the number of decorating operations per minute, and means for varying the speed of rotation of the chuck.

7. An apparatus for painting bands on ceramic articles including means for rotating an article to be decorated, a movable arm, a paint roller carried by the arm, a paint reservoir associated with and movable with the roller, a resilient connection between the roller and the arm, and means for periodically moving the arm toward and from the article.

8. An apparatus for painting bands on ceramic articles, including a rod, two arms pivotally mounted on said rod, paint rollers carried by said arms, means for oscillating said arms about the rod, means for adjusting the arms laterally, and resilient means forcing the arms laterally against said adjusting means to prevent wabbling.

9. An apparatus for painting bands on ceramic articles, including a rockable frame, a rod carried by the frame, an arm secured to said rod against movement with respect thereto, a paint roller carried by said arm, a paint reservoir associated with and movable with the roller, the roller having its lower portion in the reservoir and its upper portion projecting above the reservoir, and mechanically operated means for rocking said frame to move said roller and reservoir toward and from an article to be decorated.

10. An apparatus for painting bands on ceramic articles, including a rockable frame, a rod carried by the frame, an arm secured to said rod against movement with respect thereto, means for adjusting the arm about the rod, a paint roller carried by the arm, a paint reservoir associated with and movable with the roller, the roller having its lower portion in the reservoir and its upper portion projecting above the reservoir, and mechanically operated means for rocking the frame to move the roller and reservoir toward and from an article to be decorated.

11. An apparatus for painting bands on ceramic articles, including a rockable frame, a rod carried by the frame, an arm secured to said rod against movement with respect thereto, a paint roller carried by the arm, a resilient connection between the roller and the arm, and means for rocking the frame to move the roller toward and from an article to be decorated.

12. An apparatus for painting bands on ceramic articles, including a rockable frame, two substantially parallel rods carried by the frame, an arm secured to each of said rods against movement with respect thereto, said arms being out of alignment with each other, a paint roller carried by each of said arms, a paint reservoir associated with and movable with each roller, the rollers having their lower portions in the reservoirs and their upper portions projecting above the reservoirs, and mechanically operated means for rocking the frame to move the rollers and reservoirs toward and from an article to be decorated.

ISAAC H. STRIDER.